US009053322B2

(12) United States Patent
Wang et al.

(10) Patent No.: US 9,053,322 B2
(45) Date of Patent: Jun. 9, 2015

(54) COMPUTING ENVIRONMENT SECURITY METHOD AND ELECTRONIC COMPUTING SYSTEM

(71) Applicant: INDUSTRIAL TECHNOLOGY RESEARCH INSTITUTE, Hsinchu (TW)

(72) Inventors: Pang-Chieh Wang, Kaohsiung (TW); Jun-Bin Shi, Yunlin County (TW); Shu-Fen Yang, Hsinchu County (TW); Jun-Yu Chen, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 271 days.

(21) Appl. No.: 13/741,426

(22) Filed: Jan. 15, 2013

(65) Prior Publication Data

US 2014/0020094 A1    Jan. 16, 2014

(30) Foreign Application Priority Data

Jul. 12, 2012  (TW) .............................. 101125177 A

(51) Int. Cl.
*G06N 5/00*     (2006.01)
*G06F 11/00*    (2006.01)
(Continued)

(52) U.S. Cl.
CPC .............. *G06F 21/57* (2013.01); *G06F 21/566* (2013.01); *H04L 63/123* (2013.01); *H04L 63/168* (2013.01); *G06F 2221/033* (2013.01); *G06F 2221/2101* (2013.01)

(58) Field of Classification Search
CPC ...................................................... G06F 21/57
See application file for complete search history.

(56) References Cited

U.S. PATENT DOCUMENTS 6,282,698 B1   8/2001  Baker et al.
6,792,543 B2   9/2004  Pak et al.
(Continued)

FOREIGN PATENT DOCUMENTS

TW      I256212       6/2006
TW      200824401 A   6/2008
TW      201220118 A   5/2012

OTHER PUBLICATIONS

English Abstract translation of TWI256212 (Published Jun. 1, 2006).
Zhou, et al.: "Detecting Repackaged Smartphone Applications in Third-Party Android Marketplaces"; CODASPY'12, Feb. 7-9, 2012, San Antonio, Texas, USA. Copyright 2012 ACM 978-1-4503-1091-8/12/02.

(Continued)

*Primary Examiner* — Alan Chen
(74) *Attorney, Agent, or Firm* — McClure, Qualey & Rodack, LLP

(57) ABSTRACT

A computing environment security method is provided. The method includes: a) dissolving an application package to be tested to obtain at least one data set, wherein each data set corresponds to contents with respect to one of a plurality of aspects of the application package; and b) evaluating whether the application package is a repackaged application according to the at least one data set. Step (b) includes: c) for each data set, analyzing a characteristic relationship of the contents with respect to the aspect corresponding to the data set to accordingly generate characteristic data for the data set; and d) determining whether the application package to be tested is a repackaged application package according to the characteristic data of the at least one data set and a search result obtained from a database, wherein the search result corresponds to the characteristic data within a corresponding distance.

26 Claims, 8 Drawing Sheets

(51) Int. Cl.
*G06F 21/57* (2013.01)
*G06F 21/56* (2013.01)
*H04L 29/06* (2006.01)

(56) References Cited

U.S. PATENT DOCUMENTS

| | | | |
|---|---|---|---|
| 7,284,274 B1 | 10/2007 | Walls et al. | |
| 8,505,099 B2 | 8/2013 | Chiang et al. | |
| 8,615,801 B2 | 12/2013 | Cross et al. | |
| 8,756,432 B1 * | 6/2014 | Chen et al. | 713/188 |
| 8,844,036 B2 * | 9/2014 | Saidi et al. | 726/23 |
| 2003/0033536 A1 | 2/2003 | Pak et al. | |
| 2005/0246534 A1 * | 11/2005 | Kirkup et al. | 713/170 |
| 2007/0239993 A1 * | 10/2007 | Sokolsky et al. | 713/188 |
| 2007/0240217 A1 | 10/2007 | Tuvell et al. | |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0184369 A1 | 7/2008 | Ahn et al. | |
| 2010/0229239 A1 | 9/2010 | Rozenberg et al. | |
| 2011/0047594 A1 | 2/2011 | Mahaffey et al. | |
| 2011/0047620 A1 | 2/2011 | Mahaffey et al. | |
| 2011/0179484 A1 | 7/2011 | Tuvell et al. | |
| 2011/0271343 A1 | 11/2011 | Kim et al. | |
| 2013/0254880 A1 * | 9/2013 | Alperovitch et al. | 726/22 |

OTHER PUBLICATIONS

Lee, et al.: "A Study on Analysis of Malicious Codes Similarity Using N-Gram and Vector Space Model"; Department of Industrial Security, Kyonggi University, 94-6 Yiui-dong, Yeongtong-gu, Suwon-si, Gyeonggi-do, Republic of Korea; 978-1-4244-9224-4/11/©2011 IEEE.

Fu, et al.: "Static Detection of API-calling Behavior from Malicious Binary Executables"; 978-0-7695-3504-3/08, © 2008 IEEE DOI 10.1109/ICCEE.2008.53; pp. 388-392.

Shang, et al.: "Detecting Malware Variants via Function-call Graph Similarity"; Institute of Computer Science, Hangzhou Dianzi University, P.R. China; 978-1-4244-9356-2/10/c 2010 IEEE; pp. 113-120.

Zhang, et al.: "MetaAware: Identifying Metamorphic Malware"; supported by the National Science Foundation (NSF) under grant CNS-0627505; Dec. 2007.

Sulaiman, et al.: "Disassembled Code Analyzer for Malware (DCAM)"; 0-7803-9093-8/05/ ©2005 IEEE; pp. 398-403.

Park, et al.: "A Similarity based Technique for Detecting Malicious Executable files for Computer Forensics"; 0-7803-9788-6/06/ © 2006 IEEE; pp. 188-193.

Walenstein, et al.: "The Software Similarity Problem in Malware Analysis"; Dagstuhl Seminar Proceedings 06301 Duplication, Redundancy, and Similarity in Software http://drops.dagstuhl.de/opus/volltexte/2007/964.

TW Office Action dated Jun. 25, 2014.

* cited by examiner

COMPUTING ENVIRONMENT SECURITY METHOD AND ELECTRONIC COMPUTING SYSTEM

This application claims the benefit of Taiwan application Serial No. 101125177, filed Jul. 12, 2012, the disclosure of which is incorporated by reference herein in its entirety.

TECHNICAL FIELD

The disclosure relates to a computing environment security method and an electronic computing system.

BACKGROUND

Due to a centralized software marketplace such as "Google Play" operating on an Android platform included in a smart phone, in addition to implementing a conventional mechanism applied to a personal computer, applications on the smart phone also adopt a code signing mechanism for software security protections of the smart phone. That is, an application to be executed on a smart phone can only be executed given that the application is signed. Thus, it is not only ensured that the application is unmodified but also proven that a developer of the application is verified by the software marketplace. Further, applications on a smart phone cannot be freely acquired and distributed as those in a personal computer. More specifically, as installation processes and post-installation stages of applications on a smart phone are protected, the applications cannot be arbitrarily duplicated and propagated.

Although the protection mechanism for a smart phone is much stricter than that of a personal computer, a software cracker is still able to illegally acquire a protected application after eluding system loopholes and obtaining a root of the smart phone or jailbreaking. The cracker may then add malicious code to the acquired application, make appropriate modifications to generate a new code signature and repackage the modified application. Such cracking approach that modifies an application or adds malicious code via a software signature, repacks the modified application, and distributes the repacked application is referred to as "repackage". The repackaged application is then released to a software marketplace or placed at a piracy software website or forum, and then downloaded and installed by uninformed users, so as to propagate malware.

The repackaging frequently occurs on the Android platform since a cracker can sign a cracked application again after modifying or implanting the cracked application with malicious code. Related reports have indicated that, malware on the Google Android platform in the second half of 2011 grows at an average increasing rate of 60% monthly, with most of the malware being repackaged and distributed through marketplaces and Internet forums. Therefore, the protection against malware for the Android platform is a critical issue of computing environment security.

SUMMARY

The disclosure is directed to a computing environment security method and an electronic computing system.

According to an embodiment, a computing environment security method is provided. The method includes: a) dissolving an application package to be tested by an electronic computing system to obtain at least one data set, wherein each of the at least one data set corresponds to contents with respect to one of a plurality of aspects of the application package to be tested; and b) evaluating whether the application package to be tested is a repackaged application according to the at least one data set. Step (b) includes: c) for each of the at least one data set, analyzing a characteristic relationship of the contents with respect to the aspect corresponding to the data set and generating characteristic data for the data set; and d) determining whether the application package to be tested is a repackaged application package according to the characteristic data of the at least one data set and a search result obtained from a database to generate a determination result; wherein the search result corresponds to the characteristic data within a corresponding distance, and the database includes characteristic data associated with the aspects corresponding to a plurality of application packages. The electronic computing system processes the application to be tested according to the determination result.

According to an alternative embodiment, an electronic computing system including a communication unit and a control unit is provided. The control unit receives an application package to be tested via the communication unit. The control unit at least: dissolves the application package to be tested to obtain at least one data set, wherein each of the at least one data set corresponds to contents with respect to one of a plurality of aspects of the application package to be tested; for each of the at least one data set, analyzes a characteristic relationship of the contents with respect to the aspect corresponding to the data set to generate characteristic data for the data set; and determines whether the application package to be tested is a repackaged application package according to the characteristic data of the at least one data set and a search result obtained from a database to generate a determination result, wherein the search result corresponds to the characteristic data within a corresponding distance. The electronic computing system processes the application to be tested according to the determination result.

Figure 1:
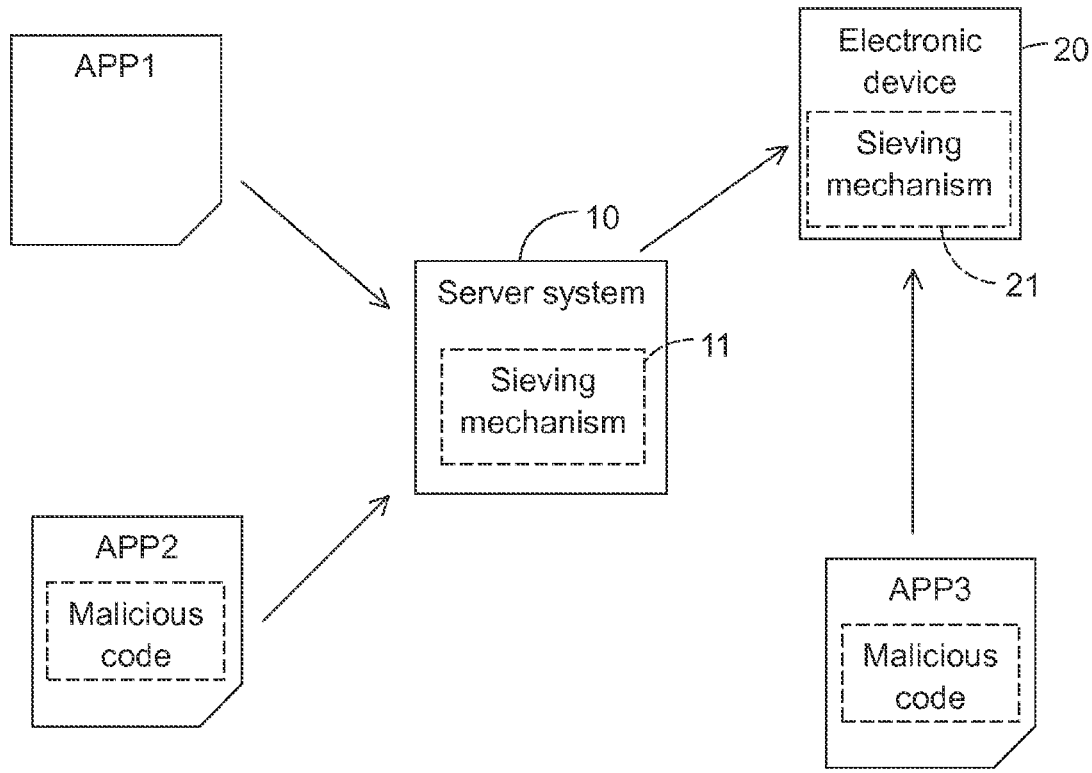
FIG. 1 is a schematic diagram of a computing environment security mechanism implemented for a release of an application to a marketplace or installation of an application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Embodiments of a computing environment security method and an electronic computing system are provided below.

FIG. 1 shows a schematic diagram of a computing environment security mechanism implemented when an application is to be released to the public or installed. Referring to FIG. 1, in a computing environment such as an application marketplace where a server system 10 provides software downloading, the server system 10, such as an independent server, a distributed server system or a cloud system, has a sieving mechanism 11. Before an application is released to the public, it is evaluated whether the application (e.g., APP1 or APP2) is a repackaged application with the assistance of the sieving mechanism 11. Accordingly, it is then determined whether the application is malware having malicious code to further determine whether the release of the application is allowed or prohibited. However, it is possible that in the computing environment, e.g., an application marketplace, other websites or sources, where an application can be downloaded and used, the sieving mechanism 11 is not included. To prevent risks of installing malware in uninformed circumstances, a sieving mechanism 21 can also be implemented on an electronic device 20. The sieving mechanism 21, before an application (e.g., APP3) is installed, can provide the functionality similar to those of the sieving mechanism 11 to determine whether to allow or decline installation of the application.

The approach that a hacker or software plagiarist cracks or modifies legitimate software of others and repackages the cracked or modified application is referred to as "repackage". By propagating malware and plagiarizing software, a hacker or a software plagiarist profits or achieves an unjust intention. A fundamental method of modifying software is adding program code of a modifier or hacker on a basis of an original program, inferring that the level of deletion or modification of functions or program code of the original program is minimal (e.g., usually not modified at all). The repackage is a common occurrence on an Android Market (or referred to as Google Play). Although an Android program package (APK) on the Android Market adopts a Safe Sign mechanism (i.e., signed by a developer) for checking other parts, the APK is not encrypted actually. Therefore, an original signature (e.g., a signature A) can be easily removed from a cracked application package (e.g., an APK), and a new signature (e.g., a signature B) can be signed after adding malicious code. With the new signature, the repackaged application can be approved for release to the public and may then be propagated very rapidly.

Figure 2:
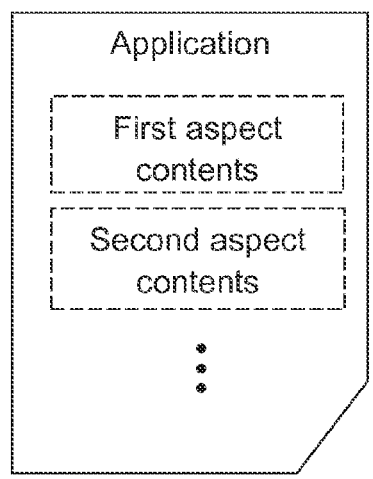
FIG. 2 is a schematic diagram of an application having contents with respect to a plurality of aspects.

Based on the likeliness of above similarities in contents of the original program and the repackaged program, the sieving mechanism 11 or 21 may accordingly determine whether an application is a repackaged application. As shown in FIG. 2, an application may be regarded as contents with respect to a plurality of aspects, e.g., contents with respect to a user interface aspect, contents with respect to a program operation aspect, contents with respect to a resource usage aspect, or contents with respect to other aspects. A repackaged application is substantially larger or equal to an original program with respect to comparisons of contents with respect to various aspects.

Further, programs generally have similarity for a certain proportion. For example, programs may generally employ same application program interfaces (API) or same user interface (UI) layouts. A characteristic of a repackaged application is usually achieved by adding or implanting intended malicious code to an original program, and a relationship of representative parameters between a repackaged application and the original program of the repackaged application can be expressed as:

$$AppO \subseteq AppR \qquad \text{Relationship (1)}$$

That is, the associated contents covered by the original program (AppO) are included in the associated contents of the repackaged application (AppR). Thus, in an embodiment, the sieving mechanism 11 or 21 may compare the contents with respect to various aspects of the programs to accordingly determine whether an application is a repackaged application.

Figure 3:
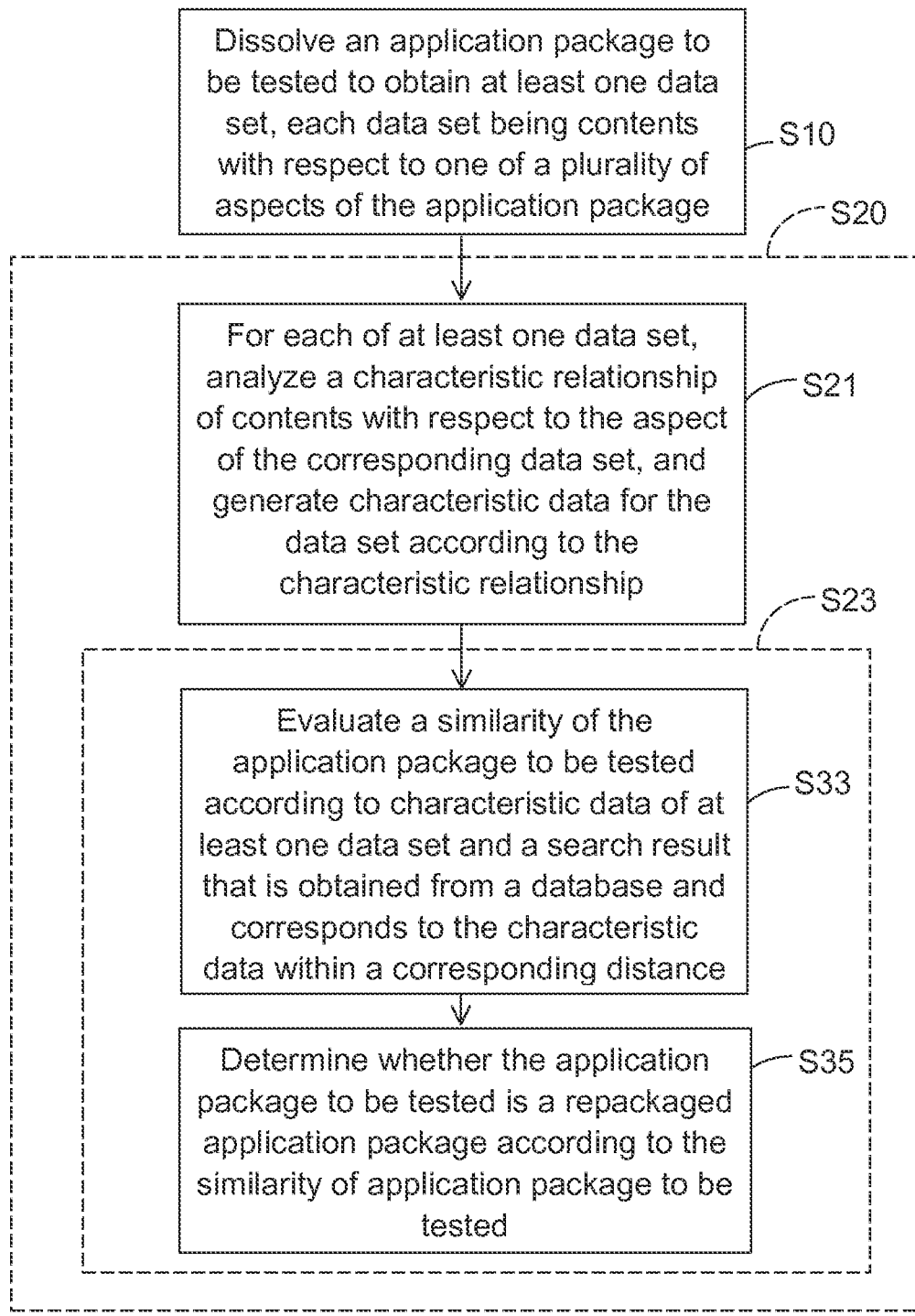
FIG. 3 is a flowchart of a computing environment security method according an embodiment.

FIG. 3 shows a flowchart of a computing environment security method according to an embodiment. The aforementioned sieving mechanism 11 or 21 may be implemented in an electronic computing system (e.g., a server system or an electronic device) of an embodiment in FIG. 3 to sieving a repackaged application.

In step S10, an electronic computing system dissolves an application package to be tested to obtain at least one data set. The application package includes contents with respect to a plurality of aspects (e.g., as those shown in FIG. 2). Each of the at least one data set is the contents with respect to one of the aspects. For example, step S10 is performed to the contents with respect to at least one, two, or three aspects from a user interface aspect, a program operation aspect and a resource usage aspect to obtain at one corresponding data set, which is later to be analyzed in step S20. For example, the contents may be parsed in step S10 to obtain the at least one data to be utilized later.

In step S20, it is evaluated whether the application package is a repackaged application according to the at least one data set. step S20 includes steps S21 and S23.

In step S21, for each of the at least one data set, characteristic relationships of the contents with respect to the corresponding aspect of the data set are analyzed, and characteristic data for the data set are generated according to the characteristic relationships. For example, for the data set of the contents with respect to the user interface aspect, relationships of a user interface layout or hierarchies of user interface elements are analyzed, and the analyzed relationships are quantized to accordingly generate characteristic data described by such as a matrix or an array, which is to be utilized in a subsequent similarity evaluation process in step S21. Details of corresponding analysis on the data set of the contents with respect to different aspects of the application are to be described shortly in embodiments below.

In step S23, it is determined whether the application package to be tested is a repackaged application package according to the characteristic data of the at least one data set and a corresponding search result obtained from a data base. The search result corresponds to the characteristic data within a corresponding distance. The electronic computing system may process the application package to be tested according to a determination result of step S23. In another embodiment, the determination result is outputted after determining whether the application package to be tested is a repackaged application package.

In step S23, for example, the database includes characteristic data associated with the aspects corresponding to a plurality of known application packages, e.g., characteristic data associated with the user interface aspect of a plurality of known applications. Further, in step S23, as obtained from the database, the search result is the characteristic data of a known application, and corresponds to the characteristic data of one or more data sets of the application package to be tested within a corresponding distance. Different data sets may correspond different distances as criteria for searching.

Therefore, the searched result obtained from the database may be based on the Relationship (1): AppO⊆AppR. A possible known application is identified from the database and assumed as the original program AppO. Also assume that the characteristic data of a particular data set of the application package to be tested is expressed in a matrix or vector, e.g., V1=[m1, m2, . . . , mk], where m1 to mk are numerical values, and k is an integer greater than 1. The database is searched for a vector (or more than one vectors) within a distance from the vector V1, and the found one vector or vectors (may be regarded as a vector set) are denoted as Vx, which corresponds to one or more known application packages (may be regarded as an application package set) denoted as Ax indicated in the database. For example, for the characteristic data of a particular data set, a distance (or a measure of the difference) between the vector 1 and the vector Vk in the database can be defined and computed mathematically based on one kind of definitions of distances between vectors (e.g., Euclidean distance and the derivatives) or similarities.

For example, a cosine numerical calculation is performed on the vectors V1 and Vs to obtain a cosine similarity. That is, the cosine similarity=(V1*Vs)/(|V1|*|Vs|). The calculated cosine value is a similarity index α. When α=1, it means that the similarity between the two vectors is high (with a minimum distance); when α=0, it means the similarity between the two vectors is small (or regarded as with a greatest distance or irrelevant). Therefore, in one embodiment, a corresponding distance range can be set. For example, when the similarity (or distance) between the vectors V1 and V2 is between 0.9 and 1, the similarity is considered as within the corresponding distance, and so the vector Vs (e.g., may be regarded as one or more vectors) and the corresponding application package (e.g., may be regarded as one or more application packages) are identified from the database to be regarded as the search result. It is determined whether the application package is a repackaged application package according to the search result, e.g., the number of the identified application packages Vx or the result having the minimum distance. In another embodiment of step S23, corresponding search results may also be identified for the characteristic data of multiple data sets of the application package to be tested to determine whether the application package is a repackaged application package.

In yet another embodiment, step S23 may include step S33 and step S35. In step S33, the similarity of the application package to be tested is evaluated according to the characteristic data of the at least one data set, and the corresponding search result that is obtained from a database and corresponds to the characteristic data within a corresponding distance. The similarity of the application package to be tested is the similarity between the application package to be tested and the corresponding application package indicated in the database.

In step S35, it is determined whether the application package to be tested is a repackage application package according to the similarity of the application package to be tested. The electronic computing system may process the application package to be tested according to a determination result of step S35. In an alternative embodiment, the determination result is outputted after determining whether the application package to be tested is a repackage application package.

Figure 4:
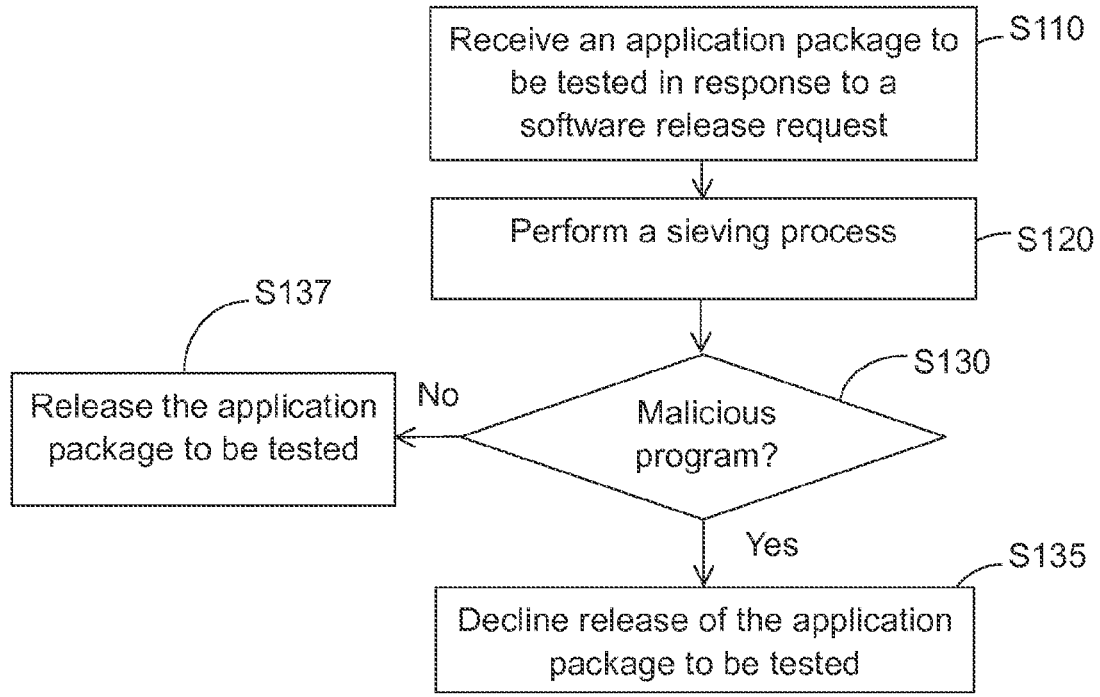
FIG. 4 is a flowchart of an embodiment of a computing environment security method applied to a server system offering services of releasing software.

FIG. 4 shows a flowchart of a computing environment security method applied to a server system offering services of releasing software according to an embodiment. In step S110, in response to a software release request, the server system receives the application package to be tested. In step S120, the sieving method explained in the embodiment in FIG. 3 is performed by the server system. In step S130, it is determined whether the application package to be tested is a repackaged application package and a malicious program according to the determination result. If the application package to be tested is determined as a repackaged application package and a malicious program, step S135 is performed. In step S135, the server system declines the release request to prohibit the application package to be tested from being released. Or else, step S137 is performed, in which the server system allows the release of the application package to be tested.

Figure 5:
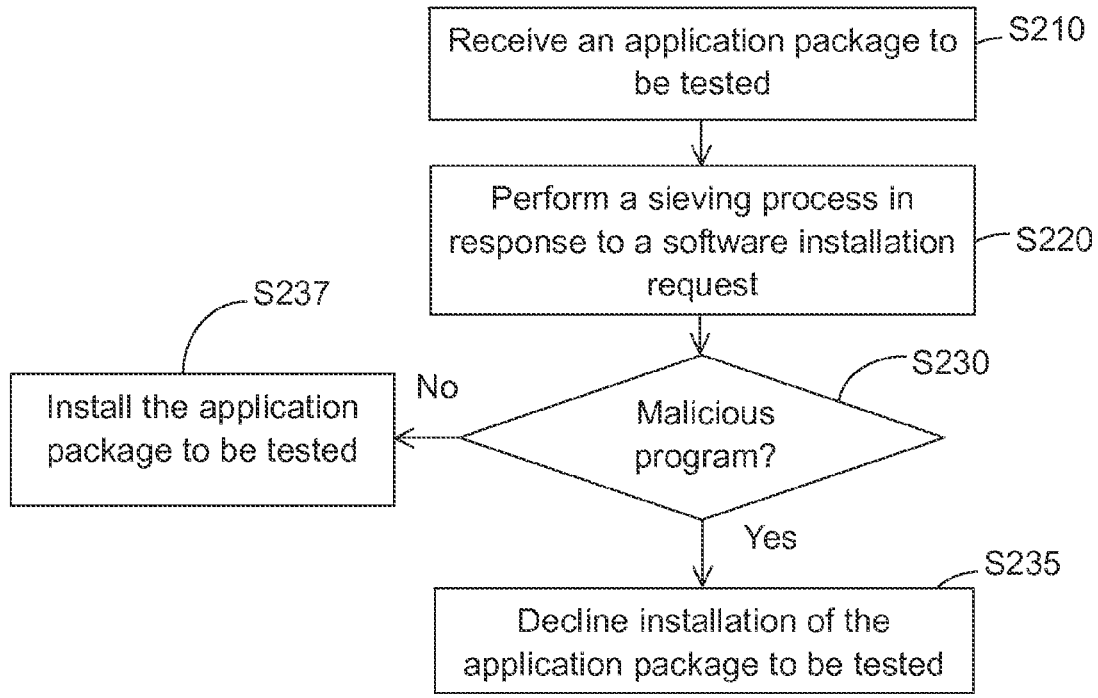
FIG. 5 is a flowchart of an embodiment of a computing environment security method applied to an electronic device with software to be installed.

FIG. 5 shows a flowchart of a computing environment security method applied to an electronic device with software to be installed according to an embodiment. In step S210, the electronic device receives the application package to be tested. In step S220, in response to a software installation request, the electronic device performs the sieving method in the embodiment in FIG. 3 before the application package is to be installed. In step S230, it is determined whether the application package to be tested is a repackaged application package and a malicious program according to the determination result. If the application package to be tested is determined as a repackaged application package and a malicious program, step S235 is performed. In step S235, the electronic device declines the software installation request. Or else, step S237 is performed, in which the electronic device allows the installation of the application package to be tested.

Figure 6:
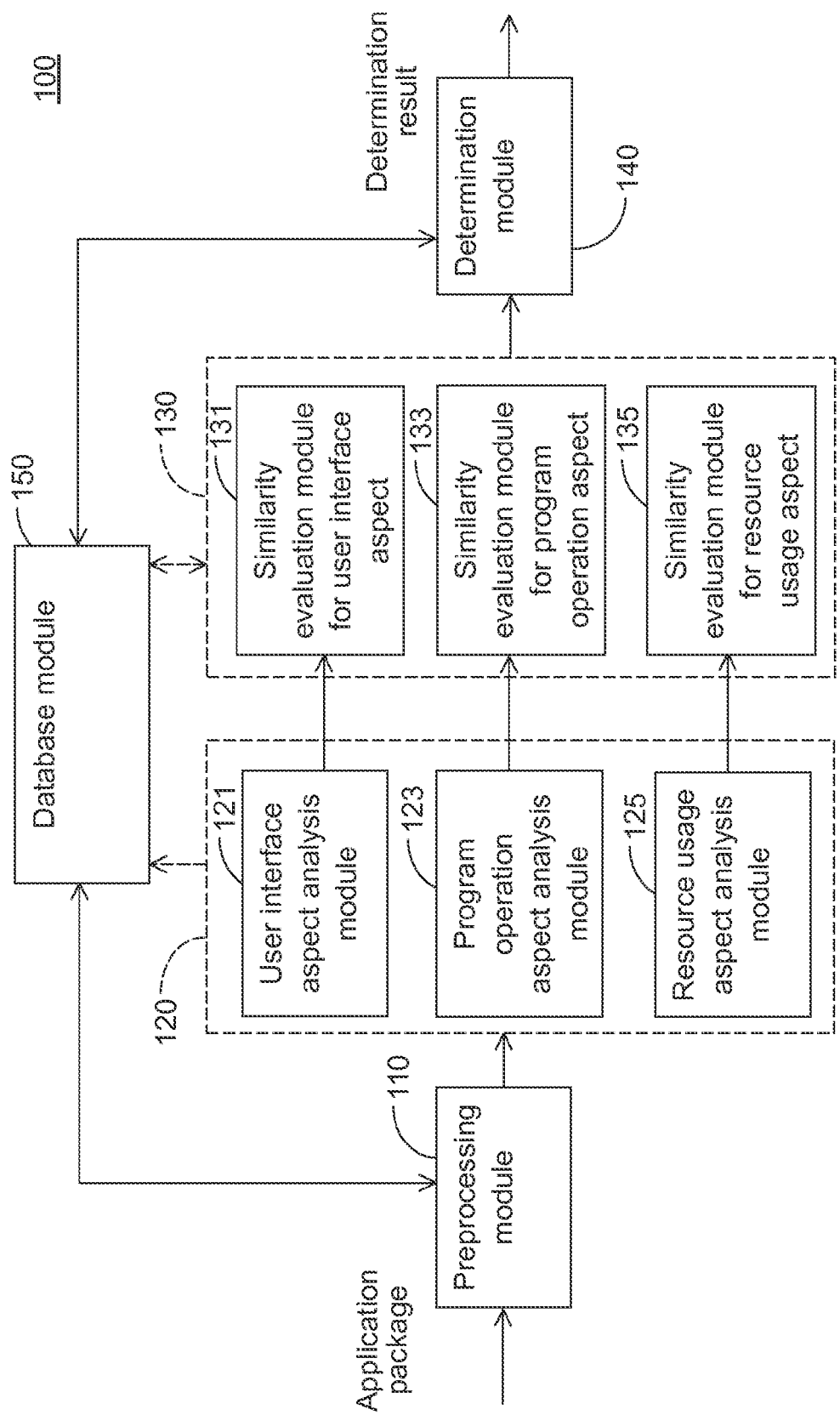
FIG. 6 is a block diagram of a software structure of a computing environment security method according to an embodiment.

FIG. 6 shows a block diagram of a software structure of a computing environment security method according to an embodiment. A computing environment security system 100 includes a preprocessing module 110, an analysis module 120, a similarity evaluation module 130, a determination module 140 and a database module 150. For example, also with reference to FIG. 3, the preprocessing module 110 performs step S10 in FIG. 3, the analysis module 120 performs step S21, the similarity evaluation module 130 performs step S33, the determination module 140 performs step S35, and the database module 150 implements the database utilized in step S23.

The embodiment in FIG. 6 depicts relationships analyzed by the analysis module 120 for the contents with respect to three aspects of the application package, and so corresponding operations of the preprocessing module 110 and the similarity evaluation module 130 are performed. For example, the preprocessing module 110 dissolves the application package by parsing to obtain three data sets. The three data sets are respectively provided to three sub-modules of the analysis module 120: a user interface aspect analysis module 121, a program operation aspect analysis module 123, and a resource usage aspect analysis module 125. The performing sequence of the sub-modules in the analysis module 120 may be in a parallel approach or other approaches as desired.

Further, to perform the corresponding operations, the similarity evaluation module 130 includes three sub-modules: a user interface aspect similarity evaluation module 131, a program operation aspect similarity evaluation module 133, and a resource usage aspect similarity evaluation module 135. The three sub-modules of the similarity evaluation module 130 respectively receive the characteristic data generated by the three sub-modules of the analysis module 120, and respectively determine similarity metadata with respect to the user interface aspect, similarity metadata with respect to the program operation aspect and similarity metadata with respect to the resource usage aspect. Based on the similarity metadata, the similarity evaluation module 130 determines the similarity of the application package to be tested to allow the determination module 140 to accordingly determine whether the application package is a repackaged application package. In another embodiment, the determination result is outputted after determining whether the application package is a repackaged application package.

In another embodiment, the sub-modules in the analysis module 120 may upload the characteristic data obtained to the database to perform the searching process. The similarity evaluation module 130 may then obtain the corresponding search result from the database module 150.

In another embodiment, the analysis module 120 may also be designed to analyze relationships between the contents with respect to two aspects of the application package, and includes the two sub-modules: the user interface aspect the analysis module 121 and the program operation aspect analysis module 123.

Figure 7:
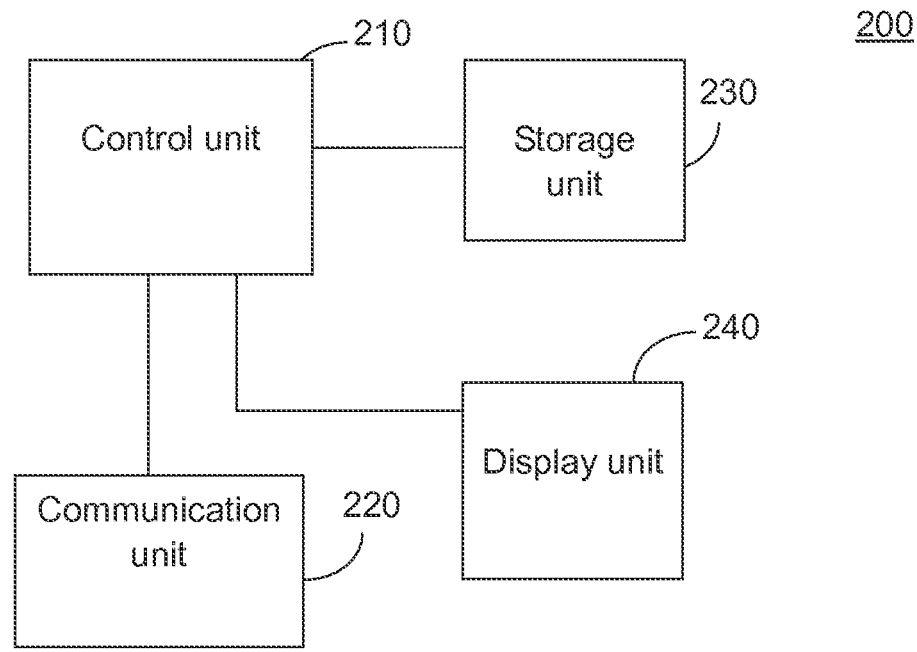
FIG. 7 is a block diagram of a fundamental structure of an electronic computing system for implementing a computing environment security method according to an embodiment.

FIG. 7 shows a block diagram of a fundamental hardware structure of an electronic computing system for implementing a computing environment security method according to an embodiment. Referring to FIG. 7, an electronic computing system 200 includes a control unit 210, a communication unit 220, a storage unit 230, and a display unit 240. For example, the control unit 210 is capable of implementing the computing environment security method according to the embodiment in FIG. 3. In an embodiment, the electronic computing system 200 is a server system implemented as a single server or is a distributed server system including multiple servers. Each of the units may be implemented as a server. For example, the storage unit 230 may be regarded as a database and serves as a database server for step S23. Alternatively, the server system may be a cloud computing system, with the units of the cloud computing system being cloud servers. In yet another embodiment, the electronic computing system 200 may be implemented as an electronic device, such as a smart device including a smart phone, a tablet computer or a smart TV, a navigation device, or any device with communication functionality which supports application download and installation. For example, the electronic device receives an application package via the communication unit 220, or obtains the search result from an external database through a communication link (e.g., a wired or wireless network). The electronic computing system 200 may be also adapted for design requirements for a target product to include other devices.

Further, the exemplary software structure in FIG. 6 may also be implemented by the electronic computing system 200 of the embodiment in FIG. 7. For example, the preprocessing module 110, the analysis module 120, the similarity evaluation module 130 and the determination module 140 are implemented by the control unit 210 (e.g., a processor or multiple servers), and the database module 150 is implemented by the storage unit 230 or an external storage unit (e.g., a database in a storage device or an external database server). The communication unit 220 (e.g., a communication circuit in a server) enables the preprocessing module 110, the analysis module 120, the similarity evaluation module 130 and the determination module 140 to connect to an external database.

Examples of the analysis on the data set of the contents with respect to different aspects of the application package in step S21 and the evaluation process in step S23 in FIG. 3 are described below. Further, the analysis module 120 and the similarity evaluation module 130 in FIG. 6 may be accordingly implemented.

Analysis for User Interface Aspect

Analysis on the contents with respect to the user interface aspect, in an embodiment can be performed with respect to at least one of the following, such as a user interface layout, hierarchies of user interface elements, associated events, and APIs, to obtain the similarity between the application package to be tested and the known application.

Figure 8:
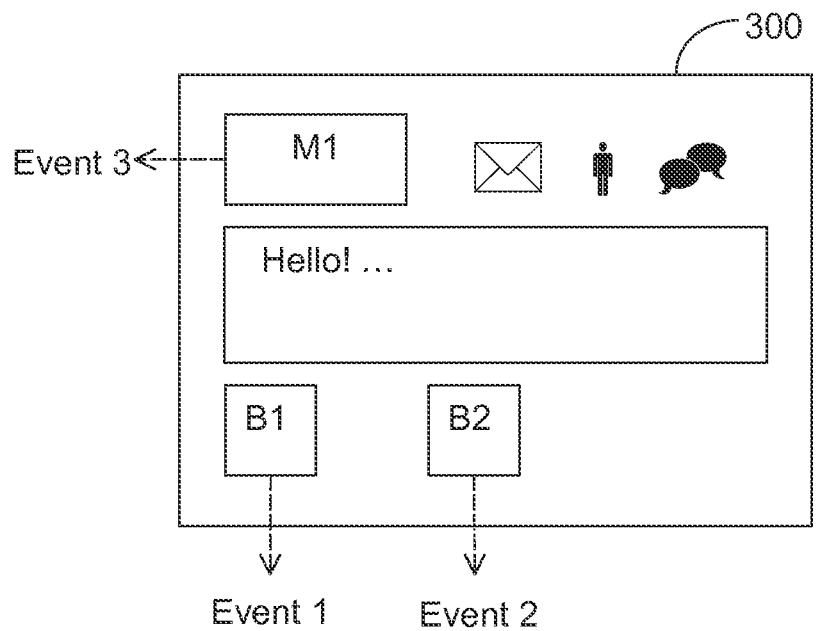
FIG. 8 is a schematic diagram related to an analysis of contents with respect to a user interface aspect in an application package according to an embodiment.

In FIG. 8, a view 300 corresponding to a user interface code of the application package includes user interface elements such as function selection buttons B1 and B2, and a command row M1, which respectively correspond to events 1, 2, and 3. Therefore, the user interface or the user interface elements in the views of the application package and associated usage information, e.g., relationships between the elements, processed/processing event contents or operations, are analyzed. After the analysis, descriptive characteristic relationships for comparisons can be obtained to generate the corresponding characteristic data, or referred to as metadata. For example, the characteristic data can be described by a matrix, an array, or other encoding methods to facilitate searching and comparison from the database.

FIG. 8 shows a schematic diagram of an exemplary user interface layout. The user interface layout includes graphics, icons, and options, relative positions and corresponding relationships of the graphics, icons and options, and elements related to event processing (e.g., menu M1 and buttons B1 and B2). Further, the API(s) called in processing functions for events and related information of the program can also be involved for analysis. The characteristic data obtained from the analysis is provided for the similarity evaluation in step S33 or to the similarity evaluation module 130 for further processing.

In an embodiment, regarding the user interface aspect, step S21 may include: analyzing the hierarchies of the views and the elements in the user interface indicated in the first data set to determine a characteristic relationship, and generating a first characteristic data for the first data set according to the characteristic relationship. In an alternative embodiment, step S21 may further include: analyzing executable code associated with the elements and the layout in at least one the user interface in the first data set to obtain relationships between the elements and k corresponding processing events, and names and numbers of the corresponding APIs, to determine a characteristic relationship, and generating a second characteristic data for the first data set according to such characteristic relationship. To correspond to step S21 in the above embodiments, step S33 may include: determining similarity metadata with respect to the user interface aspect according to the first characteristic data, the second characteristic data of the first data set, and the search result obtained from the database and corresponding to the characteristic data within a corresponding distance. The similarity of the application package to be tested is determined based on the similarity metadata with respect to the user interface aspect. Further, for the user interface aspect, step S21 may also generate only one type of characteristic data or a greater number of type of characteristic data.

Figure 9:
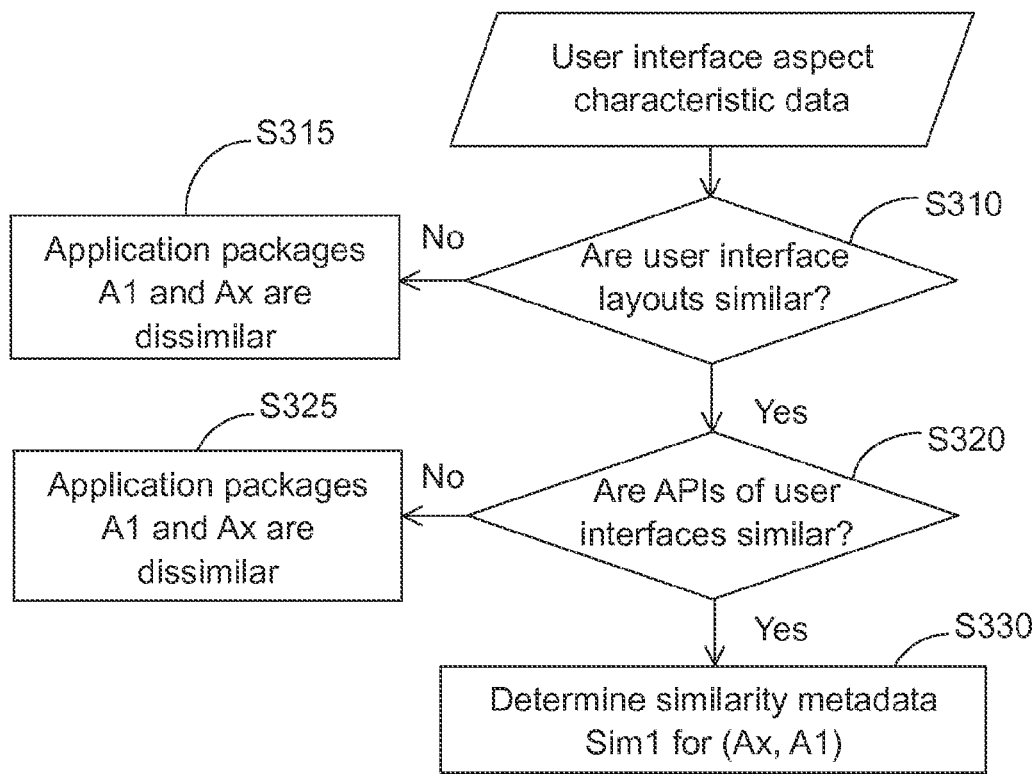
FIG. 9 is a flowchart of a similarity evaluation process on contents with respect to a user interface aspect according to an embodiment.

Referring to FIG. 9, in step S33 based on the above embodiment, the similarity between the application package (e.g., referred to as A1) to be tested and a known application package (may be regarded as an application package set) can be obtained from the database. As shown in step S310, it is determined whether the application package A1 to be tested and the application package Ax are similar. For example, a program interface, e.g, referred to as Layout(Ax, A1), can be configured for calculating the similarity between Ax and A1. According to the concept of abovementioned Relationship (1), assuming that A1 is a repackage of Ax, regarding A1 and Ax, the hierarchies of the user interface and the relationships and number of elements of the repackage program theoretically include (greater than or equal to) those of the original program. If Layout(Ax, A1) determines that the difference is beyond a tolerable range, it means that the result generated from statistics or associated calculations of the component information in the layout of the user interface is too large such that Layout(Ax, A)=F (false). Accordingly, as shown in step S315, it means that the application package A1 is dissimilar to the application package Ax. When Layout(Ax, A1)=T, i.e., the result is affirmative, step S320 is performed. In step S320, the comparison process is continued using the API(s) employed in the processing functions for the events. For example, a program interface referred to as Api(Ax, A1) can be designed for calculating the similarity associated with the application program interface aspect of Ax and A1.

For example, Layout(Ax, A1) may include the following relationship (to be referred to as Relationship (2)): if the conditions of a layout element set of Ax $\subseteq$ a layout element set of A1, and (the number of layout elements of A1)−(the number of layout elements of Ax)≤d1 are true, then Layout(Ax, A1)=T (i.e., Ax and A1 are determined as being similar), wherein d1 is as a condition for a corresponding distance (or referred to as a difference) with respect to the layout element aspect. Layout(Ax, A1) searches the database for any applications Ax included in A1 but with a distance smaller than d1 for comparison and determines whether Ax is possibly the original program from which A1 is repackaged and generated.

For example, Api(Ax, A1) may include the following relationship (to be referred to as Relationship (3)): if conditions of an API set associated with the user interface of Ax $\subseteq$ an API set associated with the user interface of A1, and (the number of the APIs of A1)−(the number of the APIs of Ax)≤d2 are true, then Api(Ax, A1)=T (i.e., Ax and A1 are determined as being similar), wherein d2 indicates a condition for a corresponding distance of the API with respect to the layout element aspect. Api(Ax, A1) searches the database for any applications Ax included in A1 but with a distance smaller than d1 for comparison and determines whether Ax is possibly the original program from which A1 is repackaged and generated.

When Layout(Ax, A1)=T and Api(Ax, A1)=T, it means that the application packages Ax and A1 have a high level of similarity, and so step S330 is performed to determine similarity metadata Sim1 associated with (Ax, A1). Therefore, this embodiment may be regarded as step S33 in an embodiment that, the similarity metadata corresponding to the user interface aspect is generated according to the first characteristic data and the second characteristic data for use in step S35 or the evaluation module 130.

Further, in another embodiment, the differences of APIs (with the differences in the corresponding number of APIs being smaller than d2) between A1 and Ax obtained by Relationship (3) can be recorded, e.g., stored in a report document. The recorded information may serve as reference information for searching the position of malicious code in the program code during dynamic inspections of malicious code.

In other embodiments, the metadata utilized by Layout( ) and Api( ) may also be utilized for establishing indexes of the foregoing database. Thus, with respect to the distance parameters, the characteristic data of the appropriate and known applications indicated in the database can be retrieved for comparison with the characteristic data of A1 to further identify the appropriate Ax.

Regarding Program Operation Aspect

Regarding the program operation aspect, the APIs or data utilized in the code can be analyzed. In an embodiment, step S21 may include:, analyzing relationships of parameters and parameter contents employed by the APIs in the executable code in the data set of the contents with respect to the program operation aspect to determine a characteristic relationship, and generating characteristic data for the data set according to the characteristic relationship.

In another embodiment, step S21 may include: analyzing a data flow of executable code of the data set of the contents with respect to the program operation aspect to determine a plurality of input data (or referred to as source data) in the data set, the processes (or referred to as processing paths) undergone by the input data, and the final operations (or referred to as final sinks) as a characteristic relationship, and generating the characteristic data for the data set according to the characteristic relationship. The processes undergone by the input data and the corresponding final operations are associated with the APIs in code flow of the data set.

The analysis of the data flow with respect to the program operation aspect facilitates the determination for a repackaged application package or even for malicious code. For example, step S21 (or the analysis module 120) acquires and analyzes information with respect to the program operation aspect from the executable code of the application core (e.g., from the data set generated in step S10) such as: APIs to be called, input/output destinations and processing paths of sensitive data in the program code, program core segments and so on.

For example, after the analysis of the program code, a code flow of a particular piece of data is expressed in pseudo code as below:

Declaring data1 as an integer;
data2=API1 (data1);
data3=API2 (data2);
API3 (data3);

In this example, the source data is "data1", the processing path is denoted as [API1, API2], and the final sink is API3, and the characteristic relationship can be expressed as {data1, [API1, API2], API3}. Program code generally includes a plurality of pieces of source data, corresponding data paths, and final sinks. The set of the characteristic relationships of the source data may be utilized to generate the characteristic data with respect to the program operation aspect of the application package to be tested, or may be referred to as metadata. For example, the characteristic data can be described by a matrix, an array, or other encoding methods to facilitate searching and comparison from the database. Further, the characteristic data is provided for use in step S33 or the similarity evaluation module 130.

For computing environment security, associated sensitive data may be analyzed in addition to common source data. For example, sensitive data for an application program of a mobile communication device (e.g., a cell phone or a tablet computer), may include such as a serial number of the device, an International Mobile Equipment Identity (IEMI), a personal identification number (PIN), communication records, and so on. For example, an analysis on the program code discovers that an API API_1 reads a phone serial number mCode (e.g., denoted as API_1(mCode)), which is then sent to a particular Internet destination location (e.g., denoted as API_2(URL)) by the API API_2 after going through a series of processing paths. Thus, the characteristic relationship of the program processing data can be represented by {mCode, [API_1(mCode), . . . ], API_2(URL)}, and the characteristic data can be generated accordingly.

In some embodiment, the analysis on the data flow associated with the program operation aspect may be implemented by taint analysis which is an approach of dynamic analysis. The taint analysis can track predefined sensitive data or hazardous data operations, and record a flow of data distribution and the data sink, to accordingly issue an alert. For example, the data sink may be a data sink involving a program operation possibly leaking the data, e.g., the Internet or an external memory card. Thus, the techniques applying the flow from the source data to the data sink in the taint analysis may be utilized to identify the characteristic relationships of software and to be further applied to step S33 or the analysis module 123. Further, data leakage may also be monitored to identify a malicious program.

Figure 10:
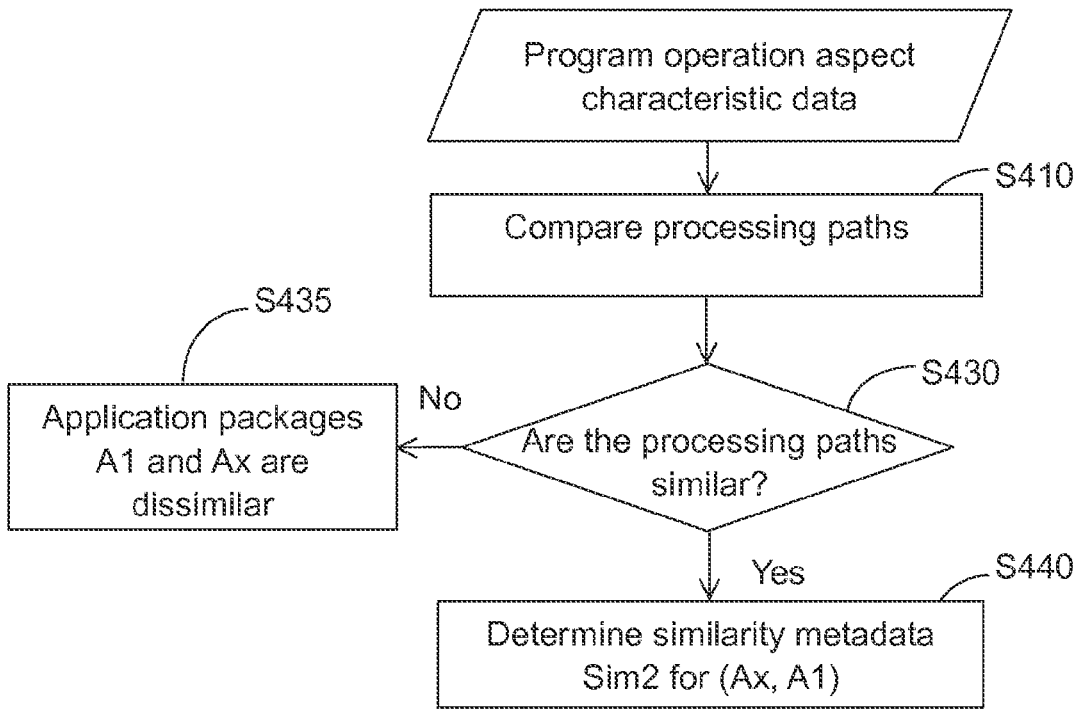
FIG. 10 is a flowchart of a similarity evaluation process on contents with respect to a program operation aspect according to an embodiment.

The characteristic data generated with respect to the program operation aspect in step S21 or by the analysis module 120 in the embodiments may be further processed in step S33 or by the similarity evaluation module 130. Referring to FIG. 10, step S33 or the similarity evaluation module 130 can perform evaluation, based on the embodiment, of the similarity between the application package (e.g., A1) to be tested and a known application package (or regarded as an application package set) found from the database. Referring to step S410, a known application package Ax and the application package A1 to be tested are compared according to the characteristic data for the program operation aspect, such as the processing path from the source data to the data sink. In step S410, existing records in the database are utilized for comparison. In addition, the range for comparison in some embodiments may be the range found by the analysis of the application package to be tested with respect to the other aspect, e.g., the application package set Ax such that Layout( )=T or Api( )=T in the foregoing static inspection. Further, a program interface, e.g., referred to as a function Path(Ax, A1), may be designed for calculating the similarity with respect to data flows between Ax and A1.

For example, Path( ) may include the following relationship (to be referred to as Relationship (4)). When conditions of a processing path set of Ax ⊆ a processing path set of A1, and (the number of processing paths of A1)−(the number of processing paths of Ax)≤d3 are true, then the function Path (Ax, A1)=T (i.e., Ax and A1 are determined as being similar), wherein d3 is a condition of a corresponding distance (or referred to as a difference) with respect to the processing path aspect. The function Path(Ax, A1) searches the database for any applications Ax included in A1 but with a distance smaller than d3 for comparison to determine whether Ax is possibly the original program from which A1 is repackaged and generated.

As shown in step S430, it is determined whether the processing paths are similar. When the function Path(Ax, A1)=F, it means that the application package to be tested A1 is dissimilar to the application package Ax. When the function Path(Ax, A1)=T, it means that a similar known application package that matches the condition is found, and the application packages Ax and A1 have a high level of similarity. Thus, step S440 is performed to determine similarity metadata Sim2 for Ax and A1.

Regarding Resource Usage Aspect

In an embodiment, regarding the resource usage aspect, step S21 may include: analyzing the relationship of resources utilized by the program indicated in the data set of the resource aspect utilized by the program to determine a characteristic relationship, and generating the characteristic data for the data set according to the characteristic relationship. The resources utilized by the program indicate data utilized by the program, and may be regarded as relationships of resources, permissions, or non-code content requested in the program code. For example, non-code content includes hyperlinks, scripts, and content files employed in the program code.

For example on an Android platform, an application package is in the form of an APK file (a packaged format) including a plurality of dex files (executable code), properties (including images, data or other files) and a manifest file. The manifest file includes settings for permission and resource usage as well as program declaration, described in XML. Thus, step S10 or the preprocessing module 110 can then generate the data set for the resource aspect utilized by the program.

For example, regarding the resource aspect utilized by the program, step S21 or the analysis module 120 parses the names and number of the requested resource or permission settings, expressed in XML, and merges them with other program-related parameters as the characteristic data.

In another embodiment, step S21 or the analysis module 120 generates characteristic data from other resource data such as images, audio, or other types of data by a hash function in order for step S33 or by the similarity evaluation module 130 to perform evaluation.

Figure 11:
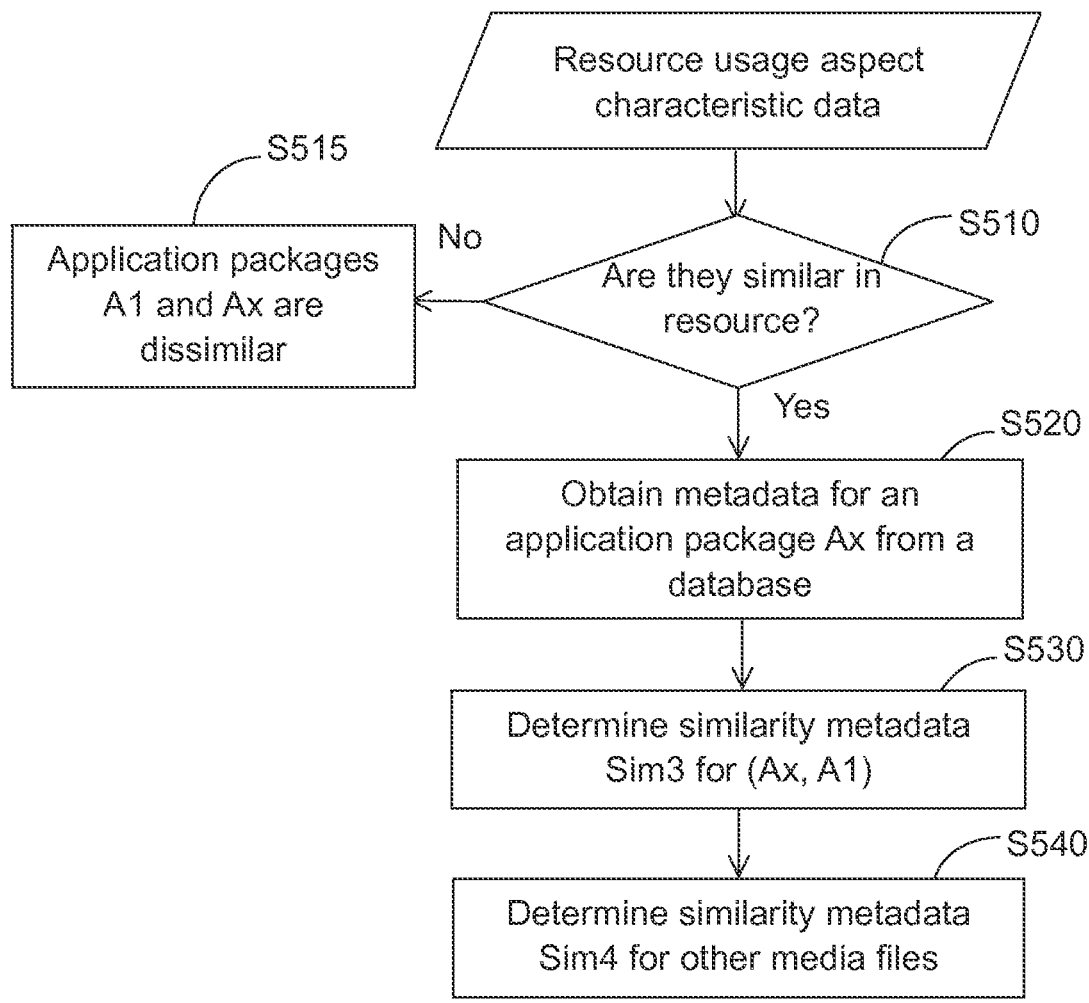
FIG. 11 is a flowchart of a similarity evaluation process on contents with respect to a resource usage aspect according to an embodiment.

Referring to FIG. 11, step S33 or the similarity evaluation module 130 can perform evaluation, based on the embodiment, of the similarity between the application to be tested (or referred to as A1) and a known application package (or regarded as an application package set) Ax found from the database. Regarding the resource usage aspect, it is determined whether the application package A1 is similar to the application package Ax, as shown in step S510. For example, a program interface such as a function Per(Ax, A1) is designed for calculating the similarity with respect to permission between Ax and A1. When Per(Ax, A1) determines that their difference is beyond a tolerable range, it means that the application package A1 to be tested is dissimilar to the application package Ax, as in step S515. When the function Per (Ax, A1)=T, i.e., the result is affirmative, the similarity of another resource aspect is further evaluated. In step S520, the metadata related to the application package A1 is obtained from the database, e.g., the foregoing metadata described in XML. In step S530, similarity metadata Sim3 for the metadata related to the application package Ax is determined. In step S540, similarity metadata Sim4 of other media files (e.g., image files) is determined.

In step S510, for example, the application package A1 to be tested and the application package Ax obtained from the database are compared. In continuation from the concept of Relationship (1), if the application package A1 is a repackage of a certain program, the permission setting for the application package A1 to be tested is expected to be greater than or equal to that of the original program. Therefore, the function Per(Ax, A1) may include the following relationship (to be referred to as Relationship (5)). When conditions of a permission set of Ax ⊆ a permission set of A1, and (the number of permissions of A1)−(the number of permissions of Ax)≤d4 are true, then Per(Ax, A1)=T (i.e., Ax and A1 are determined as being similar), wherein d4 is a condition of a corresponding distance (or referred to as a difference) associated with the permission aspect. The function Per(Ax, A1) searches the database for any applications Ax included in A1 but with a distance smaller than d4 for comparison to determine whether Ax is possibly the original program from which A1 is repackaged and generated.

Whether Application Package is Repackage

With steps S21 and S23, or the analysis module 120 and the similarity evaluation module 130 in the above embodiments, one or more similarity metadata can be generated in order for step S35 or the determination module 140 to determine whether the application package to be tested is a repackage. In an embodiment, the similarity metadata (e.g., one or more of Sim1 to Sim4) generated by step S23, step S33, or the evaluation module 130 may be utilized for evaluating the similarity index α between Ax and A1, so as to further determine whether the application package A1 is a repackage or provide a determination result of another property. For example, all the metadata (e.g., Sim1 to Sim4) are arranged in a vector, and the foregoing cosine value calculation is performed on the vector for the metadata and V1 (converted to a numerical arrangement) found from the database to calculate the similarity index α. Further, weighting may be applied to each of the metadata, for example, to reflect the contribution of the metadata with different weights, and the cosine value is then calculated to be the similarity index α.

An evaluation result of the similarity index α is represented as below.

When $\alpha \geq \beta$ ($0<\beta<1$), where β represents a predetermined similarity threshold, it is concluded that Ax and A1 are similar programs. That is, the determination result indicates that the application package A1 may be regarded as a repackage of Ax.

When $\alpha < \beta$, it means that the application package A1 is a new program. That is, the determination result indicates that the application package A1 is not regarded as a repackage of Ax.

Step S35 or the determination module 140 can provide the determination result accordingly. Referring to FIGS. 4 and 5, step S130 or step S230 may further determine whether the application package A1 to be tested is a malicious program according to the determination result. For example, in an embodiment, it is assumed that the determination result indicates that the application package A1 may be regarded as a repackage of Ax. When the inspection indicates that A1 is not an upgrade version of A1, and is not an application of the same author or the same company, it is highly possible that the application package A1 to be tested is a malicious program or a plagiarized program. Therefore, the application package A1 is declined from being released (as in step S135) or from being installed (As in step S235). Further, information of the application package A1 to be tested can be recorded in the database, or the application package A1 to be tested can be further analyzed to confirm whether a new type of malicious program exists therein. In an alternative embodiment, when A1 is not a repackage of Ax, other associated characteristic data may be further analyzed to confirm whether A1 is a malicious program or a normal program.

In other embodiments, the difference obtained from the analysis with respect to one or more aspects of the application package A1 to be test (e.g., step S21 or the analysis module 120) may be employed to evaluate whether the application package A1 to be tested is a malicious program. The information that may be used for the evaluation includes: information related to the processing path(s) that would cause a difference between the application package Ax and the application package A1 to be tested where Path(Ax, A1)=T; information that causes a difference in the permission setting (corresponding to Per( )); information that causes a difference in the user interface layout (corresponding to Layout( )); or information that causes a difference in the API (corresponding to Api( )). Further, the one or more processing paths that cause the difference may be directly compared with the characteristic data indicating data leak by known malicious programs so that malicious code or the type of a malicious program can be more clearly and earlier identified.

In other embodiments, it is determined whether the application program can be released to the marketplace or installed to a device, according to the determination result from above under predetermined criteria. Further, it may be determined whether other inspections are to be carried out according to policies of a marketplace or a service provider regardless of whether the application can be released or installed.

In another embodiment, the refusal of release or installation of the application package, or whether the evaluation process in step S20 is to be performed, can also be proceeded in cooperation with an existing mechanism of the computing platform. For example on an Android platform, an application package is in the form of an APK file (in a package format) including a plurality of dex files (executable code), properties (including images, data or other files), and a manifest file. The manifest file includes setting and program declaration for permission and utilization of associated resources, and is described in XML.

For example, step S10 or the preprocessing module 110 parses the APK file, and parses and manages the associated information in the dex files, properties, and manifest file correspondingly required by the subsequent step S20 or the analysis module 120 into the data sets (or referred to as metadata) with respect to the various aspects (e.g., one or more of the user interface aspect, the program operation aspect, and the resource usage aspect). In an embodiment, step S10 or the preprocessing module 110 parses the various parts of the APK file upon receiving an APK A1 to be tested, and a preliminary sieving process is then performed using the security information (e.g., the APK name, developer information, signature and so on) before the related information from the parsing is passed to the subsequent step S20 or the analysis module 120.

The sieving process may be realized by a comparison function Mt(APKName, Sign_Key). APKName represents the APK name and the developer information, and Sign_Key represents the key used for signing. Thus, a combination of APKName and Sign_Key may be utilized to verify the identity of the APK and the developer.

When the comparison function Mt( ) replies (T, T) indicating that the APK A1 to be tested is a known program with a legal signature key, the APK A1 need not to be further tested. The result that the APK A1 is a known program means that the APK A1 is previously tested and a corresponding entry is recorded in the database. In addition, the legal signature means that the program contents have not been modified and the integrity of the program contents is maintained. Thus, the APK A1 need not to be further tested. However, a comparison needs to be carried out to determine whether the APK A1 to be tested is on a blacklist. The APK A1 is allowed for release or installation if it is not on the blacklist; otherwise the APK A1 recorded in the blacklist is declined from installation.

A second situation of Mt( )=(T, F) indicates that the APK A1 is a known application by a known developer with however a failed verification for the signature key. It means that the program has been tampered or a transmission error may have occurred. Nonetheless, the faulty signature information infers that the integrity of the program is questionable, and so a next step of inspection is unnecessary and the APK A1 is directly declined from being released or installed.

A third situation includes Mt( )=(F, T) or (F, F). Mt( )=(F, T) indicates that the signature key is correct with however the program name being unrecorded, it means that the APK A1 to be tested should be a new program in need of further analysis and tests. Mt( )=(F, F) means that the program is a new program with a name key information unrecorded in the database, and similarly needs further analysis and tests. For the third situation, the data set obtained by step S10 or the preprocessing module 110 is next processed by step S20, as shown in FIG. 3.

The above embodiment related to step S10 or the preprocessing module 110 under the Android platform can find out application programs that are unnecessary to be further tested. However, the above embodiment is for exemplary purpose merely and the embodiments of the computing environment security method are not limiting to this.

In other embodiments, statistical approaches can be employed to obtain the characteristic data for the data set, as indicated in step S21, generated according to the characteristic relationship obtained by analyzing the application package to be tested, or to obtain the characteristic data in the database utilized in step S23. For example, for establishing the database, after the known application packages such as APK1, APK2 and APK3 are parsed, the number of times being used, the number of times being called, or other conditions of being referred to of the program components of one APK are statistically calculated and quantized, e.g., by the foregoing vector, array, or matrix, to serve as the characteristic data of the APK. For example, Table-1 lists program's descriptions with respect to the user interface aspect, the program operation aspect, and other aspects, e.g., the numbers of activities, services, and views in an Android program. For the APK1, the characteristic data is [4, 2, 2, 2, 1], and so forth. Table-2 lists the usage of one or multiple APIs, e.g., classes and class methods of one or different APIs. For an application package to be tested, the same approach may also be adopted to obtain the corresponding characteristic data to facilitate the foregoing searching in the database.

TABLE 1

| Number | APK1 | APK2 | APK3 |
|---|---|---|---|
| Activity | 4 | 3 | 6 |
| Service | 2 | 3 | 1 |
| View, TextView, Button | 2 | 1 | 1 |
| Input Event: onClick( ) | 2 | 1 | 1 |
| onLongClick( ) | 1 | 0 | 3 |

TABLE 2

| API to be used | APK1 | APK2 | APK3 |
|---|---|---|---|
| Landroid/app/ProgressDialog | 2 | 1 | 3 |
| Ljava/net/URL;->openConnection( )Ljava/net/URLConnection | 1 | 2 | 0 |
| Landroid/widget/Toast | 2 | 1 | 1 |
| Lad/notify/Downloader | 0 | 1 | 0 |
| ... | | | |

In other embodiments, the statistics of the data obtained by parsing the APKs are as shown in Table-1 and Table-2. The statistical results generated from the contents related to the calling of APIs after the parsing of the corresponding parts in the dex files can make use of a dictionary of usable APIs for all the APKs to produce the characteristic data or metadata for the APKs, wherein the dictionary of the APIs may be established in advance and includes the names of the usable Android and Java APIs, being arranged in order (or assigned with numbers). Accordingly, for a known APK or an application package to be tested, the statistical results of the entire scope of its dex files can be described as a vector Vapi=[v1, v2, v3, . . . vk] representing the statistical vector of the APIs used in the dex files. For example, the element v3 with a value of 0 in the vector Vapi may represent that the corresponding API is not used, and k indicates the number of the usable Android and Java APIs (or the number of the APIs except for some useless APIs).

In an embodiment for step S23, weighting can be applied in a search for a vector Vs corresponding to a vector V1 within a corresponding distance. Weights w1, w2, . . . and wk, which may be derived from experience or generalization, can be applied to values m1, m2, . . . and mk of the vector V1=[m1, m2, . . . , mk] to reflect these values' respective contributions and a vector Vs is then searched for with respect to the weighted vector V1. As an example referring to Table-2, the method URLConnection is relevant to the network connection of the APK and the computing environment security, and so the weight of the method URLConnection can be increased. In some embodiments, the concept of the weighting is also applicable to the similarity calculation in step S33 and step S35. That is, whether the application package to be tested is a repackaged application can be determined according to different perspectives.

Figure 12:
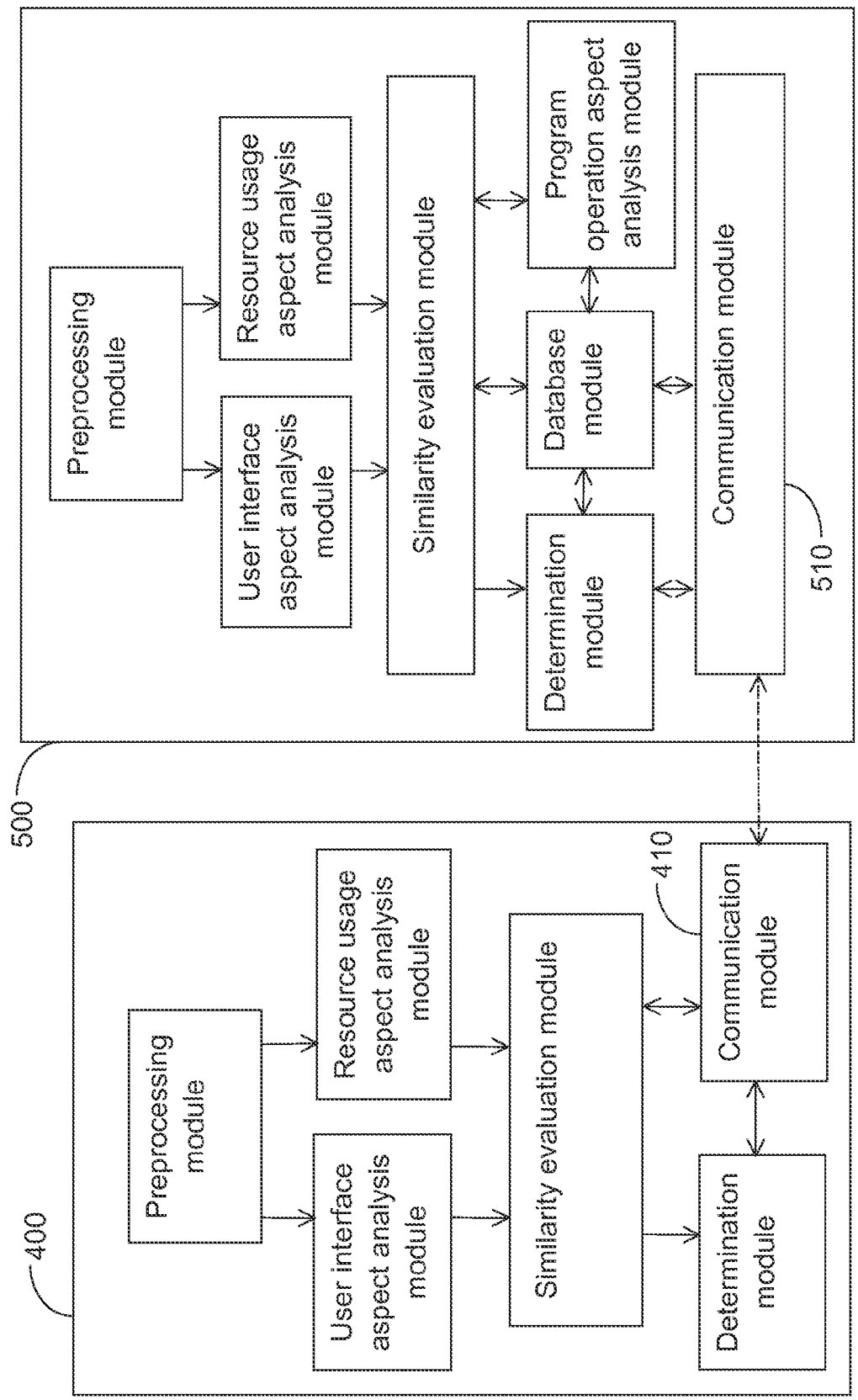
FIG. 12 is a block diagram of an electronic device and a server system implementing a computing environment security method according to an embodiment.

The steps of the computing environment security method in FIG. 3 or the modules of the software structure for computing environment security may be implemented at an electronic device or a server system (e.g., an application marketplace), or may be separately implemented at both of the electronic device and server system in different approaches. FIG. 12 shows a block diagram of an electronic device 400 and a server system 500 implementing a computing environment security method according to an embodiment. The electronic device 400 and the server system 500 respectively implement communication modules 410 and 510. As shown in FIG. 12, the server system 500 employs an embodiment of the computing environment security method to examine whether an application package is a repackaged application before releasing the application package to the marketplace. Further, the electronic device 400 may also implement an embodiment of the computing environment security method to independently perform quick inspection to maintain its security. As shown in the embodiment in FIG. 12, the modules deployed in the electronic device 400 are analysis modules for static analysis (e.g., an analysis module for the user interface aspect or the resource usage aspect). Such implementation differs from the approach of real-time inspection and monitoring of running applications, which would consume a great amount of the device end's resources, thus preventing excessive power consumption on the limited power of the mobile device.

The electronic device 400 can search data for comparison. The electronic device 400 can obtain the characteristic data or metadata of an application package similar to the application package A1 to be tested from a database (e.g., the database of the server system 500 or another database) through a communication link established by the communication module 410, for comparison. If the electronic device 400 determines that the application package A1 to be tested is a repackaged application according to the similarity index α obtained from the static inspection, the installation is declined without returning to the server system 500 for further inspection. In an embodiment, if the electronic device 400 determines that the application package A1 to be tested in a new program, the characteristic data obtained from the static inspection are sent back to the database (e.g., a database established in the server system 500 or another database) and stored therein. For example, the server system 500 is a distributed server system or a cloud server system.

In an embodiment, the electronic device 400, such as a smart device (e.g., a smart phone, a tablet computer or an Internet television), cooperates with a preload installer so as to ensure that a user does not overlook a result replied from the cloud to still install a malicious application from an unknown source. Further, rather than as in the embodiment in FIG. 12, the server system 500 and the electronic device 400 may be implemented in various methods with reference to the implementations in FIG. 3 or FIG. 6.

Moreover, although an Android platform is taken as an example in the above embodiments, it should be noted that the computing environment security method, the server system, and the electronic device according to the above embodiments can be implemented in platforms of various smart devices or even in computing environment of personal computers.

A computer readable or a computing device readable information storage medium is further provided according to an embodiment. The computer readable or a computing device readable information storage medium stores at least one program or software module for executing the computing environment security method of at least one of the above embodiments. When an electronic device including a memory or a server system (referred to as an electronic computing system) loads the information storage medium, the electronic computing system executes a plurality of instructions for executing the computing environment security method of the above embodiment. For example, the computing environment security method of the above embodiment is implemented in a server system (e.g., as a software marketplace) or an electronic device (e.g., a cell phone, a tablet computer or an Internet television). For example, the computer readable or a computing device readable information storage medium is an optical information storage medium, a magnetic information storage medium, firmware, or code transmittable via a network/transmission medium (e.g., air).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A computing environment security method, comprising:
   a) dissolving an application package to be tested by an electronic computing system to obtain at least one data set, wherein each of the at least one data set is contents with respect to one of a plurality of aspects of the application package to be tested, wherein the contents with respect to the aspects comprise contents with respect to a user interface aspect, the at least one data set comprises a first data set, and the first data set is the contents with respect to the user interface aspect of the application package to be tested; and
   b) evaluating whether the application package to be tested is a repackaged application package according to the at least one data set, step (b) comprising:
   c) for each of the at least one data set, analyzing a characteristic relationship of the contents with respect to the aspect corresponding to the data set and generating characteristic data for the data set according to the characteristic relationship; and
   d) determining whether the application package to be tested is the repackaged application package according to characteristic data of the at least one data set and a search result obtained from a database to generate a determination result; wherein the search result corresponds to the characteristic data of the at least one data set within a corresponding distance, and the database includes characteristic data associated with the aspects corresponding to a plurality of application packages;
   wherein the electronic computing system processes the application package to be tested according to the determination result.

2. The computing environment security method according to claim 1, before the step of dissolving the application package to be tested, further comprising:
   receiving the application package to be tested by a communication unit of the electronic computing system in response to a software release request;
   wherein step (b) is performed by the electronic computing system; and the electronic computing system is a server system, which declines the software release request to prohibit the application package to be tested from being released when the application package to be tested is determined as the repackaged application package and a malicious program.

3. The computing environment security method according to claim 1, before the step of dissolving the application package to be tested, further comprising:
   receiving the application package to be tested by a communication unit of the electronic computing system;
   wherein step (b) is performed by a control unit of the electronic computing system in response to a software installation program request before the application package to be tested is to be installed; and the electronic computing system declines installation of the application package to be tested when the application package to be tested is determined as the repackaged application package and a malicious program according to the determination result.

4. The computing environment security method according to claim 1, wherein step (d) comprises:
   evaluating a similarity of the application package to be tested according to the characteristic data of the at least one data set and the search result, wherein the search result is obtained from the database and corresponds to the characteristic data of the at least one data set within the corresponding distance; wherein the similarity of the application package to be tested is a similarity between the application package to be tested and an application package indicated in the database which corresponds to the search result; and
   determining whether the application package to be tested is the repackaged application package according to the similarity of the application package to be tested;
   wherein the electronic computing system obtains the search result from the database by a communication unit of the electronic computing system via a communication link.

5. The computing environment security method according to claim 1, wherein step (c) comprises:
   analyzing hierarchies of views and elements in at least one user interface indicated in the first data set to determine a first characteristic relationship accordingly, and generating first characteristic data for the first data set according to the first characteristic relationship.

6. The computing environment security method according to claim 5, wherein step (c) further comprises:
analyzing executable code associated with the elements and a layout in the at least one user interface indicated in the first data set to obtain relationships between the elements and corresponding processing events, and names and numbers of corresponding application program interfaces, to determine a second characteristic relationship accordingly, and generating second characteristic data for the first data set according to the second characteristic relationship.

7. The computing environment security method according to claim 6, wherein step (d) comprises:
determining similarity metadata with respect to the user interface aspect according to the first characteristic data, the second characteristic data of the first data set, and the search result, corresponding to characteristic data obtained from the database and corresponding to the first and second characteristic data within respective corresponding distances;
determining the similarity of the application package to be tested based on the similarity metadata with respect to the user interface aspect, wherein the similarity of the application package to be tested is a similarity between the application package to be tested and an application package indicated in the database which corresponds to the search result; and
determining whether the application package to be tested is the repackaged application package according to the similarity of the application package to be tested.

8. The computing environment security method according to claim 1, wherein the contents with respect to the aspects further comprise contents with respect to a program operation aspect, the at least one data set further comprises a second data set, and the second data set is the contents with respect to the program operation aspect of the application package to be tested.

9. The computing environment security method according to claim 8, wherein step (c) comprises:
analyzing relationship of parameters and parameter contents utilized by application program interfaces in executable code indicated in the second data set to determine a second characteristic relationship, and generating first characteristic data for the second data set according to the second characteristic relationship.

10. The computing environment security method according to claim 8, wherein step (c) comprises:
analyzing a data flow of executable code indicated in the second data set to determine a third characteristic relationship based on a plurality of input data, operations undergone by the plurality of input data, and corresponding final operations of the plurality of input data in the second data set, and generating first characteristic data for the second data set according to the third characteristic relationship;
wherein the operations undergone by the plurality of input data and the corresponding final operations of the plurality of input data are associated with application program interfaces in code flow of the second data set.

11. The method according to claim 8, wherein step (d) comprises:
determining similarity metadata with respect to the user interface aspect according to characteristic data of the first data set and a first search result corresponding to characteristic data that is obtained from the database and corresponds to the characteristic data of the first data set within a first corresponding distance;
determining similarity metadata with respect to the program operation aspect according to characteristic data of the second data set, and a second search result corresponding to characteristic data that is obtained from the database and corresponds to the characteristic data of the second data set within a second corresponding distance;
determining the similarity of the application package to be tested based on the similarity metadata with respect to the user interface aspect and the similarity metadata with respect to the program operation aspect, wherein the similarity of the application package to be tested is a similarity between the application package to be tested and an application package indicated in the database which corresponds to the first and second search results; and
determining whether the application package to be tested is the repackaged application package according to the similarity of the application package to be tested.

12. The computing environment security method according to claim 8, wherein the contents with respect to the aspects further comprise contents with respect to a resource usage aspect, the at least one data set further comprises a third data set, and the third data set is the contents with respect to the resource usage aspect of the application package to be tested.

13. The computing environment security method according to claim 12, wherein step (c) comprises:
analyzing relationships of resources indicated in the third data set to determine a fourth characteristic relationship, and generating characteristic data for the third data set according to the fourth characteristic relationship.

14. The computing environment security method according to claim 13, wherein the relationships of resources are relationships of permissions setting requested by the application package to be tested.

15. The computing environment security method according to claim 13, wherein the relationships of resources are relationships of non-code content in the application package to be tested.

16. The computing environment security method according to claim 12, wherein step (d) comprises:
determining similarity metadata with respect to the user interface aspect according to characteristic data of the first data set and a first search result corresponding to characteristic data that is obtained from the database and corresponds to the characteristic data of the first data set within a first corresponding distance;
determining similarity metadata with respect to the program operation aspect according to characteristic data of the second data set and a second search result corresponding to characteristic data that is obtained from the database and corresponds to the characteristic data of the second data set within a second corresponding distance;
determining similarity metadata with respect to the resource usage aspect according to characteristic data of the third data set and a third search result corresponding to characteristic data that is obtained from the database and corresponds to the characteristic data of the third data set within a third corresponding distance;
determining the similarity of the application package to be tested based on the similarity metadata with respect to the user interface aspect, the similarity metadata with respect to the program operation aspect, and the similarity metadata with respect to the resource usage aspect; wherein the similarity of the application package to be tested is a similarity between the application package to be tested and an application package indicated in the database and corresponding to the first, second, and third search results; and determining whether the application package to be tested is the repackaged application package according to the similarity of the application package to be tested.

17. A non-transitory computing system readable storage medium, recording a plurality of instructions executable by a computing system, for executing steps of the computing environment security method of claim 1 when the computing system executes the instructions.

18. An electronic computing system, comprising:
a communication unit; and
a control unit, for receiving an application package to be tested through the communication unit, and the control unit at least:
dissolves the application package to be tested to obtain at least one data set; wherein the application package to be tested comprises contents with respect to a plurality of aspects, and each of the at least one data set is contents with respect to one of a plurality of aspects of the application package to be tested, wherein the contents with respect to the aspects comprise contents with respect to a user interface aspect, the at least one data set comprises a first data set, and the first data set is the contents with respect to the user interface aspect of the application package;
for each of the at least one data set, analyzes a characteristic relationship of the contents with respect to the aspect corresponding to the data set to generate characteristic data for the data set according to the characteristic relationship;
determines whether the application package to be tested is a repackaged application package according to the characteristic data of the at least one data set and a search result obtained from a database to generate a determination result; wherein the search result corresponds to the characteristic data within a corresponding distance, and the electronic computing system processes the application package to be tested according to the determination result.

19. The electronic computing system according to claim 18, further comprising:
a database unit, comprising characteristic data associated with the aspects corresponding to a plurality of application packages;
wherein the electronic computing system is a server system, which declines a release request when the application package to be tested is determined as the repackaged application package and a malicious program to prohibit the application package to be tested from being released.

20. The electronic computing system according to claim 18, being an electronic device obtains the search result from a database unit by the communication unit of the electronic computing system via a communication link.

21. The electronic computing system according to claim 20, wherein when the application package to be tested is determined as the repackaged application package and a malicious program according to the determination result, the electronic computing system declines installation of the application package to be tested.

22. The electronic computing system according to claim 20, wherein when the control unit determines that the application package to be tested is not the repackaged application package and is a new application package, the electronic computing system sends the characteristic data of the at least one data set to the database unit via the communication link and stores the characteristic data of the at least one data set in the database unit.

23. The electronic computing system according to claim 18, wherein the contents with respect to the aspects further comprise contents with respect to a program operation aspect, the at least one data set further comprises a second data set, and the second data set is the contents with respect to the program operation aspect of the application package.

24. The electronic computing system according to claim 23, wherein the control unit:
determines similarity metadata with respect to the user interface aspect according to characteristic data of the first data set and a first search result corresponding to characteristic data that is obtained from the database and corresponds to the characteristic data of the first data set within a first corresponding distance; and
determines similarity metadata with respect to the program operation aspect according to characteristic data of the second data set and a second search result corresponding to characteristic data that is obtained from the database and corresponds to the characteristic data of the second data set within a second corresponding distance; and
determines the similarity of the application package to be tested based on the similarity metadata with respect to the user interface aspect and the similarity metadata with respect to the program operation aspect, and determines whether the application package to be tested is the repackaged application package, wherein the similarity of the application package to be tested is a similarity between the application package to be tested and an application package indicated in the database and corresponding to the first and the second search results.

25. The electronic computing system according to claim 23, wherein the contents with respect to the aspects further comprise contents with respect to a resource usage aspect, the at least one data set further comprise a third data set, and the third data set is the contents with respect to the resource usage aspect in the application package.

26. The electronic computing system according to claim 25, wherein the control unit:
determines similarity metadata with respect to the user interface aspect according to characteristic data of the first data set and a first search result corresponding to characteristic data that is obtained from the database and corresponds to the characteristic data of the first data set within a first corresponding distance; and
determines similarity metadata with respect to the program operation aspect according to characteristic data of the second data set and a second search result corresponding to characteristic data that is obtained from the database and corresponds to the characteristic data of the second data set within a second corresponding distance;
determines similarity metadata with respect to the resource usage aspect according to characteristic data of the third data set and a third search result corresponding to characteristic data that is obtained from the database and corresponds to the characteristic data of the third data set within a third corresponding distance; and
determines the similarity of the application package to be tested based on the similarity metadata with respect to the user interface aspect, the similarity metadata with respect to the program operation aspect, and the similarity metadata with respect to the resource usage aspect, and determines whether the application package to be tested is the repackaged application package; wherein the similarity of the application package to be tested is a similarity between the application package to be tested and an application package indicated in the database and corresponding to the first and the second and the third search results.

* * * * *